Aug. 18, 1964 C. O. SLEMMONS 3,144,679
APPARATUS FOR THE MANUFACTURE OF VINYL FLOOR COVERINGS
Filed March 16, 1962
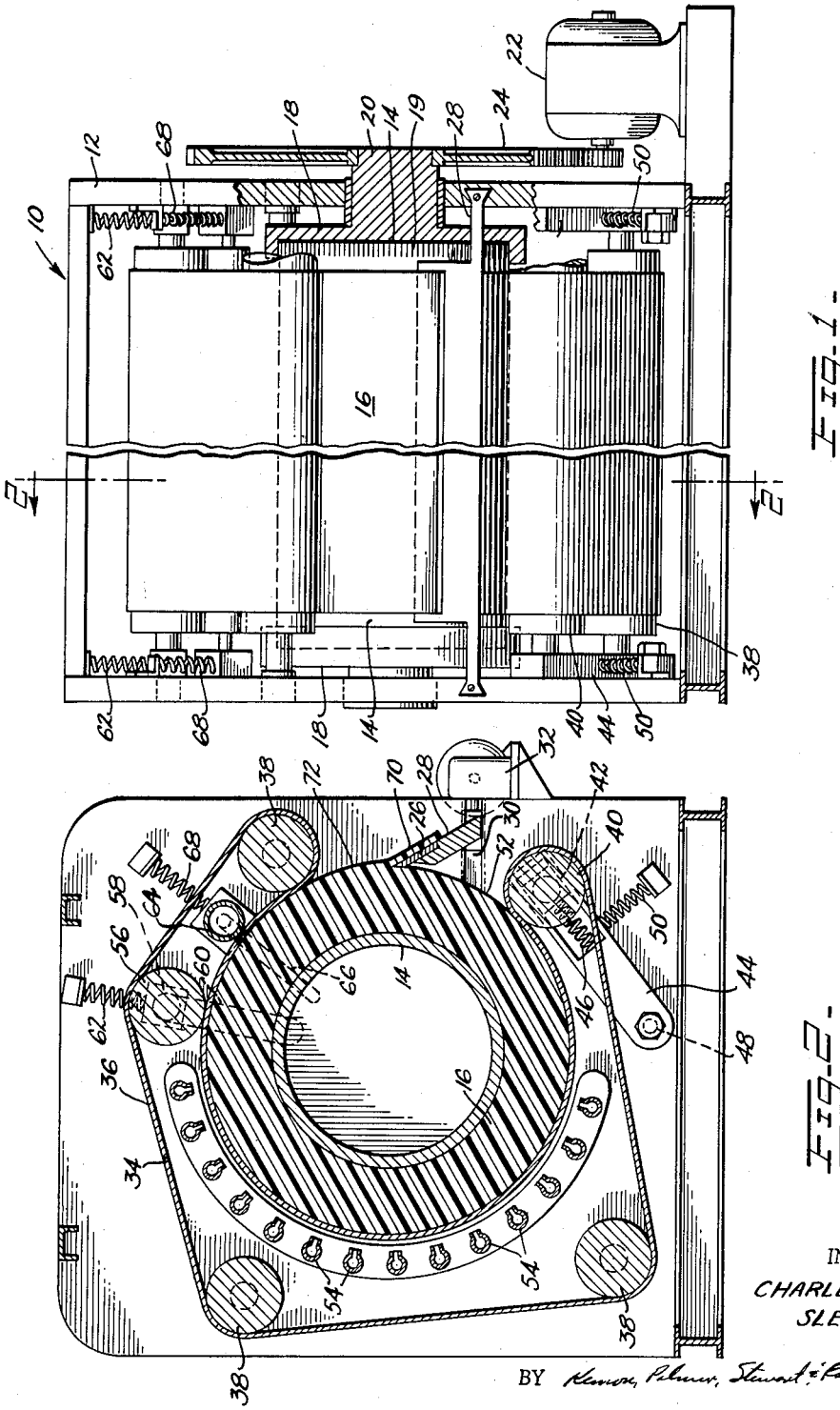
INVENTOR
CHARLES O. SLEMMONS
BY
ATTORNEYS

United States Patent Office 3,144,679
Patented Aug. 18, 1964

3,144,679
APPARATUS FOR THE MANUFACTURE OF VINYL FLOOR COVERINGS
Charles O. Slemmons, Akron, Ohio, assignor to The General Tire & Rubber Company, a corporation of Ohio
Filed Mar. 16, 1962, Ser. No. 180,175
4 Claims. (Cl. 18—1)

This invention relates to the manufacture of floor coverings and more particularly, it concerns a novel and highly effective apparatus for simultaneously polishing and separating a web from a consolidated body of vinyl plastic material having a cylindrical peripheral surface to produce floor coverings simulating terrazzo, marble and like design patterns.

Co-pending application Serial No. 180,174 filed March 16, 1962, discloses a method of manufacturing terrazzo floor tiles from such vinyl plastic materials as polymers of vinyl chloride and copolymers thereof which are polymerizable under the same conditions as vinyl chloride, e.g., a copolymer of vinyl chloride and vinylidene chloride. In the method disclosed therein, a dense, consolidated body is first formed by fusing and molding granulated vinyl plastic prepared from solid blocks of different colors and then separating from the periphery of the body thus formed, a continuous polished web from which individual tiles may be cut. Also, co-pending application Serial No. 180,173, filed March 16, 1962, discloses an apparatus particularly adapted to the formation of a dense, consolidated annular body of vinyl plastic material for use in this process. The present invention is related to the subject matter of these co-pending applications as to the general field of utility but is concerned specifically with a novel apparatus by which the polished vinyl web is removed from the consolidated body having a cylindrical peripheral surface.

An object of this invention is the provision of a novel apparatus by which a polished and properly dimensioned web of floor covering may be produced from a consolidated body of vinyl plastic material having a cylindrical peripheral surface.

Another object of this invention is the provision of an apparatus of the type referred to by which a polished sheet of vinyl may be continuously removed from the periphery of a circular body of vinyl plastic for use as in sheet form as a floor or wall covering, or, for subsequent cutting into individual floor tiles.

A further object of this invention is to provide an apparatus of the type referred to by which a rotated body of consolidated vinyl plastic is in one continuous operation, moved into working relation with means for polishing the peripheral surface thereof and with a veneer cutting blade so that a thin web of vinyl is removed from the body and having a polished surface thereon.

Other objects and further scope of applicability of the present invention will become apparent from the detailed description given hereinafter. It should be understood, however, that the detailed description, while indicating preferred embodiments of the invention, is given by way of illustration only, since it will become apparent to those skilled in the art from the description that various changes and modifications can be made without departing from the true spirit and scope of this invention.

In general, the aforementioned objects are accomplished by an apparatus having means for rotating a consolidated body of vinyl plastic having a cylindrical peripheral surface against a veneer cutting blade to peel from the periphery of the body, a continuous web. The apparatus also includes polishing means in the form of an endless belt having a smooth surface adapted to be urged against the peripheral surface of a circular vinyl body and is provided with heating means directly behind the engaging surface thereof. In this manner, the relatively rough, cut surface remaining on the body after removal of the web therefrom is polished smooth by pressure contact with the smooth surface of the heated belt. Hence, the web removed from the body will receive on one side thereof, the polished surface imparted to the periphery of the body.

A more complete understanding of the present invention and the manner in which it is practiced may be had by reference to the accompanying drawings in which:

FIG. 1 is a front elevation, partially cut away and showing the apparatus of this invention; and FIG. 2 is a cross-sectional view taken along line 2—2 of FIG. 1.

Referring now to the drawing, the machine of this invention includes a frame generally designated by the reference numeral 10 having a pair of spaced vertical walls or standards 12 for rotatably supporting a core member 14 on which the consolidated annular body 16 is formed as described in the above-mentioned co-pending application Serial No. 180,173, filed March 16, 1962. The core 14 and thus the body 16 are supported in chucks 18 adapted to engage the core positively on at least one end thereof such as by splines 19 or the like, the chucks 18 being carried on shafts 20 supported in the walls 12 and adapted to be rotatably driven by a motor 22 through gearing 24. A veneer cutting blade 26 is conventionally mounted on a carriage 28 supported in ways 30 in each of the end walls 12 and adapted to be fed inwardly at a continuous rate in synchronism with rotation of the body 16 by a motor and transmission assembly 32.

An endless polishing belt 34 having a smooth surface 36 is retained about a substantial portion of the periphery of the body 16 and therefore is constrained to form a closed loop with the smooth surface 36 facing toward the outside of the loop. To support the belt in this fashion, a plurality of idler rolls 38 are supported between the walls 12 along with a belt tension roll 40. The tension roll 40 is mounted so as to keep the belt 34 in firm engagement with the outer periphery of the body at all times and for this reason, is mounted at each end by journals 42 carried slidably on bars 44 but urged longitudinally of the bars by compression spring 46. Also, the bars 44 are pivotally mounted at 48 and resiliently urged by springs 50 toward body 16.

To effectively polish the cut peripheral surface 52 of the body 16 it is necessary that the belt 34 is heated and for this reason, a plurality of gas heaters 54 are supported between the walls 12 to be positioned within the loop of the belt and to direct flames radially against the belt portion in contact with the body 16. While gas heaters arranged in this fashion will achieve the necessary heating, it will be understood by those skilled in the art that other forms of heating means may be used, such as for example, steam, hot air, electrical heating elements and the like. Adjacent to the heaters 54 is a pressure roll 56 adapted to exert an inward pressure against the belt 34 over that portion thereof which extends between the heaters 54 and the veneer cutting blade 26. Thus, the roll 56 is supported in journals 58 slidably received in radially disposed means such as slots 60 and urged inwardly by springs 62. Also within the loop of the belt 54 and between the pressure roll 56 and the blade 26 is disposed cooling means preferably in the form of a roll 64 suitably mounted for radial adjustment in slots 66 in the walls 12 and retained in contact with the belt 34 and thus the body 16 by a spring 68. The roll 64 may assume a variety of specific forms and thus may be tubular to allow the passage of a cooling fluid therethrough or may be merely formed of thermally conductive material so as to conduct heat away from the body 16 after passage thereof under the pressure roll 56.

In operation, the body 16 is rotated by the motor 22 through gearing 24 against the knife 26 which in turn is moved radially inwardly by the motor and transmission assembly 32 to assure the proper thickness of a web 70 as it is removed from the body 16. The smooth surface 36 of the belt 34 in engagement with the peripheral surface 52 of the body 16 in combination with the heaters 54 and the roll 56 function to provide a continuously polished peripheral surface 72 on the body 16 as it rotates past the roll 56. The elevated temperature reached by the body 10 at this point due to the polishing operation, is reduced by the cooling roll 64 sufficiently so that the temperature of the body when it reaches the blade 26 is properly reduced to prevent distortion of the web as it is separated from the body by the blade 26. Also, it will be noted that the polished surface 72 imparted to the peripheral surface of the body 16 as it passes from the loop established by the belt 34 becomes part of the web 70; the cut or unpolished surface 52 continuously proceeding into contact with the smooth surface 36 of the belt to advance the continuous polishing and web-forming operation.

Thus it will be apparent from the above-given description that by this invention a highly effective apparatus is provided by producing in a single and continuous operation a polished and properly dimensioned web of vinyl plastic material, which, after annealing is usable directly for floor coverings either in sheet form or in the form of individual floor tiles cut from the web. Moreover, many variations in the present invention will now be apparent to those skilled in the art. The foregoing description, therefore, is intended to illustrate a preferred form only, the true spirit and scope of the invention encompassing other forms and to be established by the appended claims.

I claim:
1. Apparatus for producing a continuous, polished vinyl web comprising in combination:
 (a) a frame for rotatably supporting a consolidated vinyl body having a cylindrical outer surface;
 (b) means for polishing said cylindrical outer surface, said means comprising
  (1) an endless belt defining a closed loop, said belt having a smooth surface outside of said loop,
  (2) means including at least two rollers inside said loop for urging said smooth surface into pressure engagement with the periphery of the body, said rollers being disposed at angularly spaced points about said body, and
  (3) means for heating the belt over the portion thereof in contact with the body;
 (c) a veneer cutting blade on said frame; and
 (d) means for rotating said body past said polishing means and said veneer cutting blade to separate a continuous, polished web from the body.
2. The apparatus recited in claim 1 in which said heating means comprises a plurality of burners positioned inside said closed loop and facing radially inward to direct hot gases toward the body.
3. The apparatus recited in claim 1 including further, a pressure roll also inside said loop biased radially against said belt and said body, said pressure roller being positioned to follow said burners in the direction of rotation of the body.
4. The apparatus recited in claim 3 including a cooling means positioned within said loop between said pressure roller and said veener cutting blade.

References Cited in the file of this patent
UNITED STATES PATENTS

| 2,434,541 | Bierer | Jan. 13, 1948 |
| 2,442,598 | Harrison et al. | June 1, 1948 |
| 2,600,453 | Weingart | June 17, 1952 |
| 2,614,288 | Chavannes | Oct. 21, 1952 |